Patented Jan. 12, 1954

2,666,014

UNITED STATES PATENT OFFICE 2,666,014

PROCESS FOR PRODUCING RIBOFLAVIN

James M. Van Lanen, Karl L. Smiley, and Leonard Stone, Peoria, Ill., assignors to Hiram Walker & Sons, Inc., Peoria, Ill.

No Drawing. Application February 21, 1949, Serial No. 77,694

13 Claims. (Cl. 195—28)

This invention relates to a process for the biological synthesis of vitamins, particularly riboflavin (vitamin $B_2$) and related animal growth factors. More particularly it is concerned with vitamin production by the ascomycete, *Ashbya gossypii* by the cultivation of this organism under the novel conditions disclosed herein.

In general, our invention centers around our discovery that certain amino acids are most helpful to vitamin synthesis; that other such acids are desirable but only when present in the growth medium in limited amounts, and that still other amino acids, as well as certain dicarboxylic acids are undesirable when present even in small amounts in certain types of substrates.

In addition we have found that certain natural proteinaceous materials, which are wholly ineffective in the absence of the required amino acids, are very helpful to growth and vitamin synthesis in the presence of such acids.

*Ashbya gossypii*, when propagated in certain complex media, has been shown to be capable of synthesizing relatively large quantities of riboflavin. (Wickerham, L. J., et al., Arc. Biochem. 9, 95 (1946); Tanner, F. W., Jr. and Van Lanen, J. M., Jour. Bact. 54, 38 (1947); and K. L. Smiley et al., U. S. patent application Serial No. 770,330). These reports show that whereas the growth requirements of this organism are satisfied by a wide variety of media, substantial riboflavin synthesis is limited to media which contain carefully controlled amounts of metabolizable carbohydrate and proteinaceous materials of both plant and animal origin. Suitable plant proteinaceous substances which have been used in the prior art are corn steep liquor and stillage from the alcoholic fermentation of cereal grains, while peptone and packing house stick liquor are satisfactory animal proteinaceous supplements. When employed in optimum concentrations, a medium consisting of components selected from the above materials commonly yields riboflavin in the neighborhood of from 400 to 600 µg. per ml. of culture. However, in the event that either of the proteinaceous adjuncts is omitted, little or no vitamin $B_2$ is formed although growth may not be adversely affected.

While combinations of medium ingredients selected from natural sources, such as those described, generally lead to satisfactory results, their use is accompanied by several disadvantages among which are the following: (1) Yields are often variable due, apparently, to variations in the composition of medium components from lot to lot. This seemingly is due to the fact that essential as well as inhibitory constituents are present in the supplements and vary in relation to each other, thus requiring standardization prior to use. (2) The essential constituents comprise a relatively small proportion of each supplement and much extraneous matter is included which lowers the vitamin potency of the final dried product. (3) The naturally-occurring proteinaceous materials are difficult to sterilize and, if overheated in sterilization, their vitamin-producing activity is markedly reduced.

By experimentation we have discovered the factors which are essential, as well as those which are detrimental, to riboflavin synthesis. As a consequence we have made possible greater latitude in the choice of media. For example, not only purely synthetic substrates, but all substrates containing certain inorganic salts, carbohydrate, and practically any single proteinaceous substance regardless of origin can be used provided the latter is pretreated in the manner hereinafter explained.

Previous investigators have shown that *Ashbya gossypii* grows abundantly in synthetic media. (Robbins, W. J. and Schmidt, M. B., Bull. Torrey. Bot. Club 66, 139 (1939).) One growth medium which Robbins and Schmidt described was recommended for the assay of biotin with this organism and contained aspargin, sucrose, ammonium nitrate, thiamin, biotin, m-inositol and mineral salts. However, while it is adequate for growth, this medium supports no noticeable riboflavin synthesis even after extended incubation periods. We have developed from the Robbins and Schmidt medium novel riboflavin-producing media based upon our discovery that certain amino acids are essential while others are definitely inhibitory to vitamin synthesis.

Among the amino acids having an essential or supplementary nature in our media are glycine, alanine, threonine, proline, tryptophane, cystine or cysteine and norleucine. On the other hand other such acids, namely glutamic acid, aspartic acid, and aspargin, although favorable to growth over a wide range of concentrations, markedly inhibit riboflavin elaboration when present at certain levels. Since these inhibitory amino acids are generally present in proteins and protein concentrates in relatively high proportions, proteins hydrolyzed by acids, enzymes, or alkalies are unsuitable as such until these inhibitory amino acids are either reduced to a favorable level or are completely removed. Histidine, and to a lesser extent, leucine and methionine are also inhibitory in this fermentation. Therefore, for satisfactory results the media must be adjusted in their content of each of these amino acids.

By using certain synthetic media we have discovered that several of the dicarboxylic acids, i. e. fumaric, succinic, malic and glutaric sharply inhibit riboflavin synthesis in *Ashbya gossypii* cultures. A characteristic which the inhibitory acids possess in common is their participation in the so-called citric acid cycle of metabolism (Krebs, H. A., Advances in Enzymology, vol. 3, 1943). The close structural and physiological relationship of these compounds to glutamic and aspartic acids suggests that they may have a common mode of action in retarding synthesis. However, it should be understood that we do not limit our invention to any particular theory as to how the biosynthetic processes might operate.

In addition to certain required and supplementary amino acids, we have found that riboflavin synthesis is increased by other as yet unidentified substances. The activity of such substances is well demonstrated by the addition of a small quantity of yeast extract, fermentation solubles, or other natural proteinaceous products to synthetic substrates which by themselves lead to some riboflavin production. These supplements, which we find are wholly ineffective in the absence of the required amino acids, in the presence of the latter give more rapid growth and substantially higher yields of vitamins.

In general our process is carried out by preparing a medium containing fermentable carbohydrate, certain inorganic salts and vitamins which are essential to the growth of *Ashbya gossypii*, and amino acids, the latter being supplied either in pure form or as pretreated, hydrolyzed protein. If desirable, other substances can be added but they are purely supplementary and not essential either to growth or to riboflavin formation. The medium is adjusted to a pH of from about 5 to 7.5 preferably to pH 6.0 to 7.5 and is sterilized with steam under pressure. After sterilizing and cooling, an actively growing culture of *Ashbya gossypii* is introduced and the medium is aerated by a stream of sterile air, by mechanical agitation, or by combinations of these methods. Following the fermentation, which requires from 3 to 7 days, riboflavin is recovered by any of several methods well known in the art leaving a residue rich in other vitamins which can be utilized in feeds, foods or pharmaceutical products. Alternatively, the whole culture may be evaporated and dried to provide a concentrate of riboflavin along with other vitamins and animal growth factors which may be used as a feed product supplement. By microbiological assay procedures we have discovered that *Ashbya gossypii* synthesizes besides riboflavin in the substrates described, appreciable amounts of pantothenic acid, pyridoxin, and folic acid and smaller quantities of other vitamins of the B complex group. Over and above these substances there are produced as yet unidentified animal growth factors the existence of which have been demonstrated by chick feeding trials using appropriate rations. It is apparent therefore that our final fermented products may have a variety of nutritional uses depending upon the particular need.

Metabolizable carbohydrate equivalent to 1.5 to 5.0 per cent is generally recommended, the optimum being influenced somewhat by the other conditions of cultivation notably the type and degree of aeration. Glucose has been used most frequently as the source of carbohydrate. However, various other fermentable sugars might be employed such as sucrose or maltose, as well as crude preparations containing any of these sugars such as maltose sirup, blackstrap, beet, and high test molasses or hydrol. With some types of molasses it has been found advantageous to pretreat the molasses with dilute acid prior to incorporating it into the medium.

Thiamin, biotin, and inositol are required for the growth of *Ashbya gossypii* and hence should be present as supplementary ingredients in completely synthetic media. These supplementary vitamins can be supplied as concentrates from natural sources or in crystalline form. The recommended quantities of each factor per liter of medium is as follows: biotin, 2 $\mu$g.; thiamin, 200 $\mu$g.; and inositol, 10 mg. These levels can be varied over a fairly wide range without altering appreciably the yield of riboflavin. However, it has been observed that biotin when present in amounts greater than 200 $\mu$g. per liter has a depressing effect on vitamin synthesis and consequently such concentrations should be avoided.

Inorganic compounds of an essential or stimulatory character which should also be present as supplementary ingredients in completely synthetic media to promote growth of *Ashbya gossypii* include monopotassium phosphate, magnesium sulfate, ammonium nitrate, and calcium carbonate. It should be understood, of course, that required elements such as the aforementioned usually can be supplied equally well by a wide variety of compounds provided the particular element is metabolically available to the organism and the compound is free of toxic substances. In the subject process, however, the source of nitrogen appears to constitute an exception in that urea, and to a considerable degree ammonium sulfate, inhibit riboflavin synthesis and consequently are to be avoided, especially in high concentrations, as substitutes for ammonium nitrate.

Trace elements such as manganese, copper, thallium, zinc, sulphur, boron, iron, and iodine are preferably added if the medium contains no natural products such as proteins or yeast extract and if distilled water is used instead of tap water. There is no demonstrable effect upon riboflavin formation by omitting or increasing to tenfold the recommended level of these trace elements. However, they promote growth of *Ashbya gossypii* and therefore, like the vitamins and inorganic compounds referred to in the two preceding paragraphs, should be added in order to provide a growth medium if no natural product containing them is present in the medium.

As previously stated, both the type and concentration of a number of amino acids influence riboflavin synthesis. Those of highest activity are listed below along with their recommended limits of concentration. It should be understood, of course that the concentration of one or more of these amino acids could be varied considerably in relation to the others, and in fact might be eliminated entirely in some cases, with little change in the effectiveness of the medium.

| | Per cent |
|---|---|
| Glycine | 0.01 to 0.7 |
| Alanine | 0.01 to 0.7 |
| Threonine | 0.01 to 0.7 |
| Proline | 0.01 to 0.7 |
| Tryptophane | 0.01 to 0.1 |
| Norleucine | 0.01 to 0.1 |
| Aspargin, aspartic acid or glutamic acid | 0.01 to 0.05 |
| Cystine or cysteine | 0.001 to 0.05 |

It is preferred that there be incorporated in the growth medium from 0.025% to 2% of a plurality of amino acids selected from the above group, other than aspargin, aspartic acid or glutamic acid. Within the limits of concentration stated above, aspargin, aspartic acid, or glutamic acids enhance both growth and riboflavin production but higher levels are undesirable since they sharply reduce synthesis. Methionine, histidine, and leucine also inhibit synthesis when supplied even in small amounts to synthetic substrates although the quantities present in protein hydrolyzates do not appear to cause a serious reduction in the yield of products. Other amino acids contained in protein hydrolyzates have been observed to exert little or no influence upon the degree of vitamin elaboration.

Protein hydrolyzates are usually added to give concentrations corresponding to 0.5 to 3.0 per cent of the original substance. Hydrolysis may be accomplished with acids, alkalies, or enzymes following conventional procedures for hydrolyzing proteins. As examples of suitable hydrolytic agents in this connection mention may be made of hydrochloric and sulphuric acids, sodium and barium hydroxides, and the enzymes trypsin, pepsin and papain.

Following hydrolysis, the hydrolyzate is clarified by filtration or centrifugation, and the deleterious amino acids are removed by treatment with resins of the anion exchange type as hereinafter described, or by other known methods such as separation of these acids by virtue of the insolubility of their barium salts in alcohol. The pretreated hydrolyzates are then incorporated with the other medium components and sterilized. Our process will be further elucidated in the examples which follow:

EXAMPLE 1

A basal synthetic medium was prepared which contained in 500 ml. of aqueous solution the following compounds:

| | | |
|---|---|---|
| $MgSO_4.7H_2O$ | gm | 0.5 |
| $NH_4NO_3$ | gm | 1.0 |
| $KH_2PO_4$ | gm | 5.0 |
| Calcium carbonate | gm | 1.0 |
| Sucrose | gm | 20 |
| Inositol | mg | 10 |
| Thiamin | μg | 200 |
| Biotin | μg | 2 |
| $MnSO_4$ | mg | 1.0 |
| $Tl_2SO_4$ | mg | 1.0 |
| $ZnSO_4$ | mg | 1.0 |
| $H_3BO_3$ | mg | 1.0 |
| $FeCl_3$ | mg | 0.5 |
| KI | mg | 0.1 |
| $CuSO_4.5H_2O$ | mg | 0.1 |

This medium was distributed in 50 ml. quantities in 500 ml. Erlenmeyer flasks and the supplements shown in Table 1 were added. Each flask was then adjusted to pH 6.5 by the addition of sodium hydroxide and the final volume was brought to 100 ml. The flasks were plugged with cotton and sterilized with steam at a pressure of 15 pounds per square inch gage (p. s. i. g.) for 15 minutes. After cooling, each flask was seeded with 0.1 ml. of an actively growing culture of *Ashbya gossypii* which had been propagated on the above basal medium supplemented with 0.1 percent peptone. Cultures were incubated for 5 days at 30° C. during which time the flasks were shaken continuously in a reciprocating mechanical shaker. Riboflavin was then determined in the culture liquors by a fluorimetric method. Results are shown in Table 1.

*Table 1*

| Medium No. | Medium | Supplement Substance | Mg./100 ml. | Riboflavin, μg./ml. |
|---|---|---|---|---|
| 1 | Synthetic basal | None | | Less than 1.0. |
| 2 | do | Yeast extract | 100 | 1.4. |
| 3 | do | Glycine / Alanine / Threonine / Proline | 50 of each | 33. |
| 4 | Medium No. 3 above | Tryptophane / Norleucine / Aspargin / Cystine | 5 of each | 136. |
| 5 | Medium No. 4 above | Yeast extract / Distillers' solubles | 100 / 1,000 | 192. |
| 6 | Synthetic basal | Glycine / Alanine / Threonine / Proline | 50 of each | 95. |

It is readily apparent from the results of this experiment that synthesis of riboflavin is negligible in the basal medium and in the basal medium to which yeast extract is added. However, by supplementation with the "active" amino acids the medium supports substantial riboflavin production. Moreover, it is shown that small quantities of natural products such as yeast extract and distillers' solubles when added to synthetic medium containing active amino acids stimulate the production of riboflavin to a substantial degree

EXAMPLE 2

Further demonstration of the stimulatory behavior of yeast extract when added to a riboflavin-producing synthetic medium is revealed in Example 2. A basal medium was prepared identical with that in Example 1. It was dispersed in 50 ml. quantities of double-strength concentration into 500 ml. Erlenmeyer flasks and each flask received .05 g. each of glycine, alanine, threonine and proline and varying levels of yeast extract in the amounts shown in Table 2. After adjustment of all solutions to pH 6.5, the volume of each flask was brought to 100 ml.

and the flasks were plugged with cotton and sterilized with steam at 15 p. s. i. g. for 15 minutes. The amount of inoculation and the method of aeration, were the same as for the previous example. Riboflavin yields after 5 days are shown in Table 2.

Table 2

| Medium | Riboflavin, μg./ml. |
|---|---|
| 1. Synthetic basal plus 0.05 percent each of glycine, alanine, threonine, and proline | 66 |
| 2. As No. 1 above plus yeast extract, 0.1 percent | 96 |
| 3. As No. 1 above plus yeast extract, 0.2 percent | 240 |
| 4. As No. 1 above plus yeast extract, 0.3 percent | 248 |
| 5. As No. 1 above plus yeast extract, 0.5 percent | 44 |
| 6. As No. 1 above plus yeast extract, 1.0 percent | 15 |

These results reveal that yeast extract contains a principle which greatly increases the production of riboflavin when added to synthetic medium. The beneficial action of yeast extract was most pronounced when it was supplied in relatively low concentrations whereas greater amounts were markedly inhibitory. In the present instance a maximum response was elicited at concentrations of 0.2–0.3 percent and inhibition occurred at an above 0.5 percent. Other proteinaceous products of natural origin such as stillage from grain alcohol fermentation, distillers' solubles, and peptone have been found to stimulate similarly although they may possess variable activity and therefore must be assayed for activity preliminary to use. By the addition of all known vitamins and growth factors to synthetic medium the non-identity of the substance contained in yeast extract with other known growth factors has been established.

As referred to previously, dicarboxylic amino acids and related compounds interfere with the production of riboflavin by *Ashbya gossypii*. This interference is well demonstrated by the following experiment. Synthetic basal medium was prepared in double strength as previously described and placed in 50 ml. quantities in ten 500 ml. Erlenmeyer flasks. One gram of peptone was added to each of eight flasks. Aspargin was added to duplicate flasks of peptone-basal medium to provide concentrations of 0.1, 0.5 and 1.0 per cent. Two flasks of basal medium were unsupplemented and served as the negative control. All flasks were adjusted to pH 6.2 and the total volume in each was brought to 100 ml. with distilled water. The flasks were plugged and sterilized as outlined under Example 1. The sterilized and cooled media were inoculated and shaken continuously during a 4 day incubation period. Results expressed as the yield of riboflavin produced are summarized in Table 3.

Table 3

| Medium No. | Ingredient | Riboflavin, μg./ml. |
|---|---|---|
| 1 | Synthetic Basal | Less than 1. |
| 2 | No. 1 above plus 1.0 percent peptone | 300. |
| 3 | No. 2 above plus 0.1 percent aspargin | 260. |
| 4 | No. 2 above plus 0.5 percent aspargin | 220. |
| 5 | No. 2 above plus 1.0 percent aspargin | 58. |

From the data presented it is readily apparent that aspargin has a marked depressing action upon the synthesis of riboflavin by *Ashbya gossypii*. Although aspargin was employed as the inhibitor in this experiment similar effects are obtainable by using glutamic, aspartic and succinic and similar acids. It has been noted also that the concentration of inhibitor varies appreciably with the type of medium selected. In general it has been observed that completely synthetic substrates are more susceptible to inhibition by dicarboxylic acids.

Previous examples have shown that riboflavin synthesis is dependent upon the presence of certain "active" amino acids, and by the absence, or low level, of other amino acids, viz. members dicarboxylic group. In view of the need to balance amino acids it follows that the failure of most protein hydrolyzates to promote riboflavin synthesis might be related directly to their content of dicarboxylic amino acids. Especially would this be true of cereal proteins which are commonly rich in these compounds, e. g., glutamic acid. If this hypothesis is correct protein hydrolyzates from which the dicarboxylic amino acids were removed should be a suitable source of the required amino acids.

It has been demonstrated (Block and Balling, the Amino Acid Composition of Proteins and Foods, C. C. Thomas, Publisher, Springfield, Illinois, 1945, p. 245) that synthetic anion exchange resins are capable of specifically binding dicarboxylic amino acids. To determine whether this technique might be an effective means of treating protein hydrolyzates several proteins were hydrolyzed and treated in the following manner.

Fifty gram quantities of casein, gelatin, peptone, soybean meal and distillers' solubles were placed in 1 liter Erlenmeyer flasks and 500 ml. sulfuric acid solution (25 percent by weight) was added. Hydrolysis was accomplished by autoclaving at 15 p. s. i. g. for 10 hours. The hydrolyzates were neutralized to pH 3.5 with $Ba(OH)_2$ and the precipitated $BaSO_4$ was removed by filtration. Anion exchange resin (analytical grade Amberlite IR–4) was allowed to stand in contact with 5 per cent $Na_2CO_3$ for 24 hours. The resin was then washed with distilled water until the washings were approximately neutral. Ten gram quantities of the prepared resin were then placed in 500 ml. Erlenmeyer flasks and 50 ml. of each hydrolyzate (containing 5 g. of original protein material) was added to respective duplicate flasks. The flasks were agitated by means of a mechanical shaker for 3 hours at 85° F. The resin was separated by filtration and the treated and untreated hydrolyzates were added to 50 ml. of double strength synthetic basal medium to supply 1 per cent based upon the weight of original protein.

All media were adjusted to pH 6.2 and the volume was brought to 100 ml. with distilled water. The flasks were plugged with cotton, sterilized, and, after being cooled, were inoculated with an actively growing culture of *Ashbya gossypii*, as previously described. Riboflavin determinations on the culture liquors were made after an incubation period of 4 days.

Table 4

| | Protein hydrolyzate | Amberlite IR–4 treatment | Riboflavin, μg./ml. |
|---|---|---|---|
| 1 | Casein | − | 8 |
| 2 | do | + | 108 |
| 3 | Gelatin | − | 20 |
| 4 | do | + | 62 |
| 5 | Soybean | − | 5 |
| 6 | do | + | 43 |
| 7 | Peptone | − | 10 |
| 8 | do | + | 40 |

Results summarized in Table 4 reveal that hydrolyzed proteins which were not treated for removal of dicarboxylic amino acids gave poor yields of riboflavin. On the other hand, the various proteins of both plant and animal origin were substantially improved by treatment with the anion exchange resin. It will be readily understood that other methods of separating the deleterious compounds from various natural products might be equally feasible. While in this trial the proteins were completely hydrolyzed, the same procedure could be applied to proteinaceous substances partially hydrolyzed with acids or enzymes.

What we regard as new and desire to secure by Letters Patent is:

1. The process wherein riboflavin is biologically synthesized, by aerobically cultivating the ascomycete Ashbya gossypii in a growth medium containing a fermentable carbohydrate, inorganic nutrient salts and biotin, thiamin and inositol, and also containing a protein hydrolyzate containing a plurality of metabolizable amino acids selected from the group consisting of glycine, alanine, threonine, proline, tryptophane, norleucine, cysteine and cystine, the dicarboxylic amino acid content of said protein hydrolyzate being reduced to an amount of not over 0.05% and being thereby rendered substantially noninhibitory to vitamin synthesis said protein hydrolyzate being the sole source of proteinaceous material in said growth medium.

2. The process wherein riboflavin is biologically synthesized, by aerobically cultivating the ascomycete Ashbya gossypii in a growth medium comprising in major proportion an aqueous solution containing inorganic nutrient salts, thiamin, biotin and inositol, together with 0.025 to 2% of a plurality of amino acids substantially free of other protein hydrolysis products and selected from the group consisting of glycine, alanine, threonine, proline, tryptophane, norleucine, cysteine and cystine, said amino acids constituting the sole source of proteinaceous material in said growth medium.

3. The process wherein riboflavin is biologically synthesized, by aerobically cultivating the ascomycete Ashbya gossypii in a growth medium comprising in major proportion an aqueous solution containing inorganic nutrient salts, thiamin, biotin and inositol, and also containing as the sole source of proteinaceous material in said growth medium 0.025 to 2% of a plurality of amino acids substantially free of other protein hydrolysis products and selected from the group consisting of glycine, alanine, threonine, proline, tryptophane, norleucine, cysteine and cystine, and from 0.01% to 0.05% of at least one amino acid substantially free of other protein hydrolysis products and selected from the group consisting of aspargin, aspartic acid and glutamic acid.

4. The process wherein riboflavin is biologically synthesized, by aerobically cultivating the ascomycete Ashbya gossypii in a growth medium comprising in major proportion an aqueous solution containing inorganic nutrient salts, thiamin, biotin and inositol, and also containing as the sole source of proteinaceous material in said growth medium 0.025 to 2% of a plurality of amino acids substantially free of other protein hydrolysis products and selected from the group consisting of glycine, alanine, threonine, proline, tryptophane, norleucine, cysteine and cystine, and from 0.01% to 0.05% of at least one amino acid substantially free of other protein hydrolysis products and selected from the group consisting of aspargin, aspartic acid and glutamic acid, said growth medium also containing a minor proportion of a yeast substance-containing material of the class consisting of yeast extract, yeast fermentation residues and solubles derived therefrom.

5. The process as set forth in claim 4, wherein the yeast substance-containing-material is yeast extract.

6. The process as set forth in claim 4, wherein the yeast substance-containing-material is grain-yeast distillers' solubles.

7. The process wherein riboflavin is biologically synthesized, by aerobically cultivating the ascomycete Ashbya gossypii in a growth medium comprising in major proportion an aqueous solution containing inorganic nutrient salts, thiamin, biotin and inositol, together with 0.025 to 2% of a plurality of amino acids substantially free of other protein hydrolysis products and selected from the group consisting of glycine, alanine, threonine, proline, tryptophane, norleucine, cysteine and cystine, and additional protein hydrolysis products in amount such that the content of metabolizable dicarboxylic amino acids in said growth medium does not exceed 0.05%, said amino acids and protein hydrolysis products constituting the sole source of proteinaceous material in said growth medium.

8. The process wherein riboflavin is biologically synthesized, comprising the steps of preparing a growth medium containing a fermentable carbohydrate, inorganic nutrient salts, and biotin, thiamin and inositol, preliminarily treating a solution of hydrolyzed proteinaceous material with an anionic exchange resin, thereby removing dicarboxylic amino acids therefrom, incorporating said treated proteinaceous material in said growth medium, whereby the content of metabolizable dicarboxylic amino acids therein is no more than 0.05%, and aerobically cultivating the ascomycete Ashbya gossypii therein.

9. The process in accordance with claim 8 wherein the solution of hydrolyzed proteinaceous material is a solution of hydrolyzed peptone.

10. The process wherein riboflavin is biologically synthesized, comprising the steps of preparing a synthetic growth medium by solution in water of a fermentable carbohydrate, inorganic nutrient salts and biotin, thiamin and inositol, incorporating therein a plurality of amino acids selected from the group consisting of glycine, alanine, threonine, proline, tryptophane, norleucine, cysteine and cystine, and not over 0.05% of an amino acid selected from the group consisting of aspargin, aspartic acid and glutamic acid, adding thereto a yeast substance-containing material of the class consisting of yeast extract, yeast fermentation residues and solubles derived therefrom and aerobically cultivating the ascomycete Ashbya gossypii therein.

11. The process of claim 10 wherein the yeast substance-containing-material is yeast extract.

12. The process of claim 10 wherein the yeast substance-containing-material is grain-yeast distillers' solubles.

13. The process wherein riboflavin is biologically synthesized, comprising the steps of preparing a synthetic growth medium by solution in water of a fermentable carbohydrate, inorganic nutrient salts and biotin, thiamin and inositol, and incorporating therein a plurality of amino acids selected from the group consisting of glycine, alanine, threonine, proline, tryptophane, norleucine, cysteine and cystine, and not over 0.05% of an amino acid selected from the group consisting of aspargin, aspartic acid and glutamic acid, providing therein trace amounts of inorganic substances to supply ions and elements of the group consisting of $NH_3$, $NO_3$, $PO_4$, K, Ca, Mg, Mn, Cu, Fe, Zn, S, B, I and Tl, and aerobically cultivating the ascomycete *Ashbya gossypii* therein.

JAMES M. VAN LANEN.
KARL L. SMILEY.
LEONARD STONE.

References Cited in the file of this patent

UNITED STATES PATENTS

| Number | Name | Date |
|---|---|---|
| 2,202,161 | Miner | May 28, 1940 |
| 2,313,275 | Schopmeyer | Mar. 9, 1943 |
| 2,445,128 | Tanner | July 13, 1948 |
| 2,447,814 | Novak | Aug. 24, 1948 |
| 2,483,855 | Stiles | Oct. 4, 1949 |
| 2,578,738 | Pridham | Dec. 18, 1951 |

OTHER REFERENCES

Wickerham et al.: Arch. Biochem., 9, 1, January 1946, pp. 95–98.

Liggett et al.: Bacteriological Reviews, 12, 4, December 1948.

Block: Proc. Soc. Exptl. Biol. & Med., 51, 1942, pp. 252–3.

Cardinal et al.: Jour. Biolchem. Soc. 172 (1948), p. 611.